No. 880,575. PATENTED MAR. 3, 1908.
W. W. ROWLEY.
MOLDING MACHINE.
APPLICATION FILED JAN. 30, 1907.

Inventor
William W. Rowley,

Witnesses
Frank Hough

By Victor J. Evans
Attorney

UNITED STATES PATENT OFFICE.

WILLIAM W. ROWLEY, OF JACKSON, MICHIGAN, ASSIGNOR TO WILLIAM F. COWHAM, OF JACKSON, MICHIGAN.

MOLDING-MACHINE.

No. 880,575.　　　Specification of Letters Patent.　　　Patented March 3, 1908.

Application filed January 30, 1907. Serial No. 354,880.

*To all whom it may concern:*

Be it known that I, WILLIAM W. ROWLEY, a citizen of the United States of America, residing at Jackson, in the county of Jackson and State of Michigan, have invented new and useful Improvements in Molding-Machines, of which the following is a specification.

This invention relates to molding machines and one of the principal objects of the same is to provide an adjustable mold for concrete blocks, sills or other concrete structures.

Another object of the invention is to provide a molding device which can be readily adjusted to the required length and width for molding sills or blocks, the adjustment being made quickly.

Figure 1:
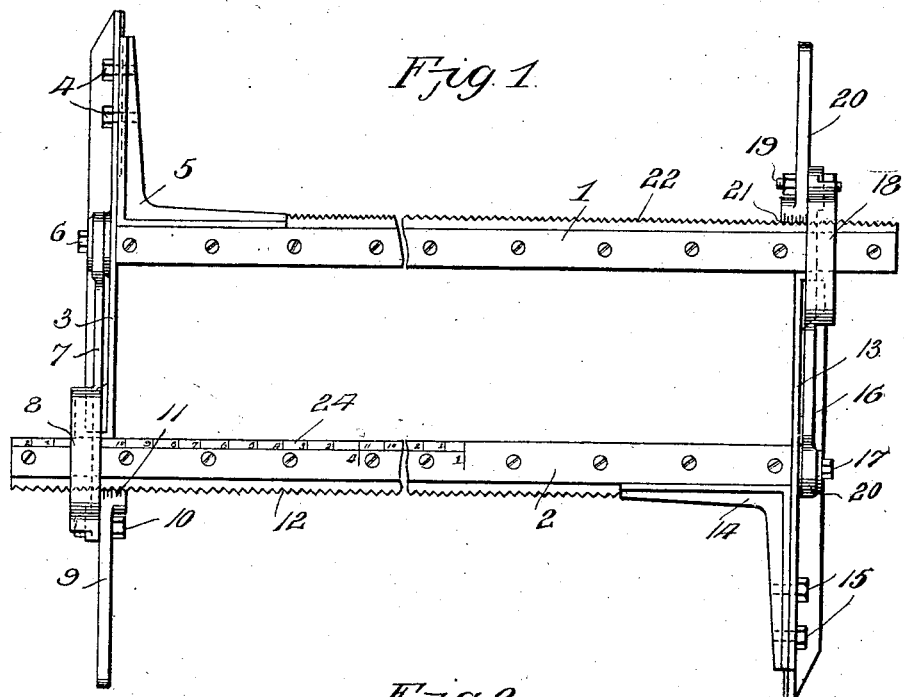
Figure 2:
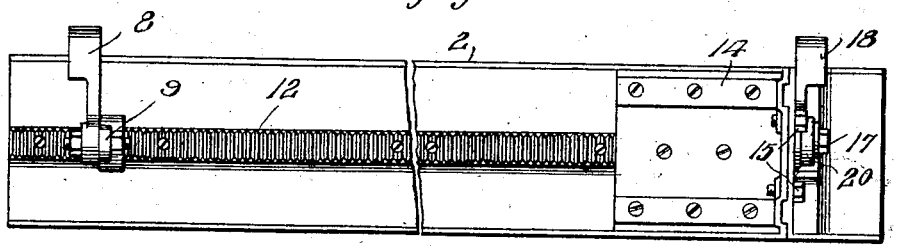
Figure 3:
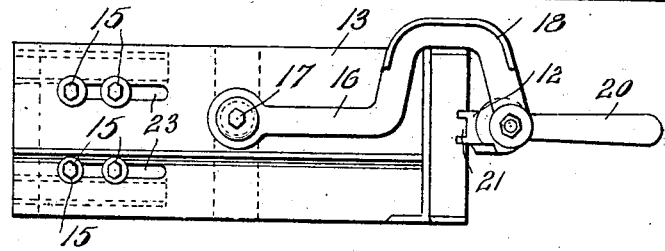

These and other objects may be attained by means of the construction illustrated in the accompanying drawings, in which:

Figure 1 is a plan view of a mold made in accordance with my invention. Fig. 2 is a side elevation of the same. Fig. 3 is an end elevation.

Referring to the drawing for a more particular description of my invention, the numeral 1 designates one of the sides of the mold, and 2 is the other side thereof. Connected to one end of the side 1 is an end member 3, said member being bolted at 4 to bracket 5 secured to the member 1. Pivoted at 6 to the end 3 is a lever 7 provided with a curved portion 8 to which is pivotally connected a cam lever 9, said lever being pivoted upon a bolt 10 and provided with a notched face 11 which engages a series of notches 12 formed upon the side 2 of the mold frame. The member 2 is provided with an end 13 bolted to a bracket 14 secured to the member 2 and by bolts 15 to the sides 13. A lever 16 is pivoted at 17 to the side 13 and is provided with a curved portion 18 to which is pivoted at 19 a cam lever 20 also provided with a notched face 21 to engage notches 22 in the side member 1.

Upon reference to Fig. 3 it will be seen that the bar or member 2 is adjustably secured to the member 13 by means of the bolts 15 passing through slots 23. Upon the member 2 is a series of indicating marks 24 by means of which the adjustable members may be positioned relatively to mold a block or sill of a given size.

The operation of my invention may be briefly described as follows: The member 1 carrying the end member 3 and the member 2 carrying the end member 13 may be relatively adjusted by means of the bolts 4 and 15 and the slots 23 to the width of the block to be molded. After this has been done any number of blocks of the same width or thickness can be readily molded without further adjustment of the parts. The notched members 1 and 2 and the cam levers 9 and 20 then permit a quick adjustment of the mold for forming and discharging the block.

Having thus described the invention, what I claim is:

1. A molding machine for concrete blocks comprising side members, each carrying an end member, said side members each provided with notches upon one of their edges, a cam lever pivoted to each end member, said levers each having a notched face to engage the notches in the side members, and independent means comprising angular brackets and bolts for adjusting the side and end members to the size of block desired, substantially as described.

2. In a molding machine, side members, end members adjustably connected one to each side member by means of angular brackets, one of said side members having gage marks thereon, and said side members provided with notched edges, bolts passing through slots in said end members and through said angular brackets for adjusting said members to the size of the block required, and cam levers for securing said end members in adjusted position upon said side members, substantially as described.

In testimony whereof, I affix my signature in presence of two witnesses,

WILLIAM W. ROWLEY.

Witnesses:
　JAMES N. HOUSE,
　GEORGE M. BAKER.